(12) United States Patent
Stirling-Gallacher et al.

(10) Patent No.: US 9,121,943 B2
(45) Date of Patent: Sep. 1, 2015

(54) BEAM FORMING DEVICE AND METHOD

(75) Inventors: Richard Stirling-Gallacher, Dallas, TX (US); Qi Wang, Stuttgart (DE); Ralf Boehnke, Esslingen (DE)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 13/461,284

(22) Filed: May 1, 2012

(65) Prior Publication Data

US 2012/0299773 A1 Nov. 29, 2012

(30) Foreign Application Priority Data

May 23, 2011 (EP) .................................... 11167065

(51) Int. Cl.
| | |
|---|---|
| *G01S 13/00* | (2006.01) |
| *G01S 13/42* | (2006.01) |
| *G01S 13/88* | (2006.01) |
| *H01Q 3/34* | (2006.01) |
| *G01S 13/89* | (2006.01) |
| *G01S 13/06* | (2006.01) |
| *H01Q 3/24* | (2006.01) |
| *H01Q 3/26* | (2006.01) |

(52) U.S. Cl.
CPC .............. *G01S 13/89* (2013.01); *G01S 13/885* (2013.01); *G01S 13/887* (2013.01); *G01S 13/888* (2013.01); *H01Q 3/2605* (2013.01); *H01Q 3/34* (2013.01); *G01S 13/003* (2013.01); *G01S 13/06* (2013.01); *G01S 13/42* (2013.01); *H01Q 3/24* (2013.01); *H01Q 3/26* (2013.01)

(58) Field of Classification Search
USPC ......... 342/22, 74, 81, 89–101, 368, 371, 372, 342/417, 422, 444–446, 459, 463–465
See application file for complete search history.

(56) References Cited

U.S. PATENT DOCUMENTS

| | | | | |
|---|---|---|---|---|
| 3,978,482 A | * | 8/1976 | Williams et al. | ............... 342/142 |
| 3,995,271 A | * | 11/1976 | Goggins, Jr. | ..................... 342/91 |
| 4,117,538 A | * | 9/1978 | Shrader et al. | .................. 342/91 |
| 4,780,720 A | * | 10/1988 | Watts | ............................... 342/91 |
| 4,992,796 A | * | 2/1991 | Apostolos | ..................... 342/156 |

(Continued)

FOREIGN PATENT DOCUMENTS

| | | |
|---|---|---|
| EP | 0 812 005 A2 | 12/1997 |
| EP | 0 812 005 A3 | 12/1997 |

OTHER PUBLICATIONS

The Extended European Search Report issued Aug. 6, 2012, in Application No. / Patent No. 12168078.9-2220.

(Continued)

*Primary Examiner* — Peter Bythrow
(74) *Attorney, Agent, or Firm* — Oblon, McClelland, Maier & Neustadt, L.L.P.

(57) ABSTRACT

The present disclosure relates to a beam forming device, comprising a transmit unit comprising at least two transmit elements that transmit radiation towards a scene, a receiver unit comprising at least two receive elements that receive radiation from said scene and that generate receive signals from said received radiation, and a beam forming unit that performs beam forming to obtain beam formed output signals from said receive signals by use of beam forming weights, wherein said beam forming weights are adapted to a distance between the scene and one or more transmit elements and/or receive elements, said distance being indicated by a distance indicator, and wherein said beam forming weights are changed if said distance changes.

26 Claims, 8 Drawing Sheets

(56) References Cited

U.S. PATENT DOCUMENTS

| | | | |
|---|---|---|---|
| 5,218,359 A * | 6/1993 | Minamisono | 342/383 |
| 5,251,186 A * | 10/1993 | Lockwood | 367/103 |
| 5,532,700 A * | 7/1996 | Lockwood | 342/378 |
| 5,559,519 A * | 9/1996 | Fenner | 342/174 |
| 5,592,179 A * | 1/1997 | Windyka | 342/372 |
| 5,854,612 A * | 12/1998 | Kamiya et al. | 342/383 |
| 5,920,285 A * | 7/1999 | Benjamin | 342/368 |
| 6,049,307 A * | 4/2000 | Lim | 342/383 |
| 6,087,986 A * | 7/2000 | Shoki et al. | 342/383 |
| 6,188,915 B1 * | 2/2001 | Martin et al. | 455/562.1 |
| 6,339,399 B1 * | 1/2002 | Andersson et al. | 342/372 |
| 6,462,709 B1 * | 10/2002 | Choi | 342/378 |
| 6,664,921 B2 * | 12/2003 | Pratt | 342/357.63 |
| 6,771,219 B2 * | 8/2004 | Sim | 342/382 |
| 6,867,735 B2 * | 3/2005 | Song et al. | 342/377 |
| 6,894,643 B2 * | 5/2005 | Guo et al. | 342/383 |
| 6,940,917 B2 * | 9/2005 | Menon et al. | 375/267 |
| 7,205,936 B2 * | 4/2007 | Park et al. | 342/368 |
| 7,406,336 B2 | 7/2008 | Astely et al. | |
| 7,535,410 B2 * | 5/2009 | Suzuki | 342/162 |
| 7,565,171 B2 | 7/2009 | Doi et al. | |
| 7,672,640 B2 | 3/2010 | Nyshadham et al. | |
| 7,965,234 B2 * | 6/2011 | Park et al. | 342/372 |
| 8,116,818 B2 * | 2/2012 | Jin et al. | 455/562.1 |
| 8,125,388 B2 * | 2/2012 | Kennedy et al. | 342/417 |
| 8,232,918 B2 * | 7/2012 | Chang | 342/368 |
| 2001/0049295 A1 * | 12/2001 | Matsuoka et al. | 455/562 |
| 2003/0142015 A1 * | 7/2003 | Boe et al. | 342/372 |
| 2008/0107196 A1 * | 5/2008 | Won | 375/260 |
| 2008/0204319 A1 * | 8/2008 | Niu et al. | 342/368 |
| 2009/0237294 A1 * | 9/2009 | Shoji et al. | 342/159 |
| 2010/0090897 A1 * | 4/2010 | Nakada et al. | 342/372 |
| 2010/0164805 A1 | 7/2010 | Niu et al. | |
| 2010/0220001 A1 | 9/2010 | Longstaff | |
| 2011/0109495 A1 * | 5/2011 | Takeya et al. | 342/107 |
| 2013/0002488 A1 * | 1/2013 | Wang et al. | 342/377 |

OTHER PUBLICATIONS

Anthony T. S. Ho, et al., "Through-Wall Radar Image Reconstruction Based on Time-Domain Transient Signals in the Presence of Noise", Geoscience and Remote Sensing Symposium, 2005, Igarss, vol. 6, XP010848733, Jul. 25, 2005, pp. 4271-4274.

U.S. Appl. No. 13/494,549, filed Jun. 12, 2012, Wang, et al.

U.S. Appl. No. 13/546,625, filed Jul. 11, 2012, Stirling-Gallacher, et al.

Seunghyeon Hwang et al., "Signal Enhancement in a Near-Field MIMO Environment Through Adaptivity on Transmit", IEEE Transactions on Antennas and Propagation, vol. 53, No. 2, Feb. 2005, pp. 685-693.

Joachim H. G. Ender et al., "System Architectures and Algorithms for Radar Imaging by MIMO-SAR", IEEE Radar Conference 2009, pp. 1-6.

Jens Klare et al., "First Experimental Results with the Imaging MIMO Radar MIRA-CLE X", EUSAR Conference 2010, pp. 374-377.

Xiaodong Zhuge et al., "MIMO-SAR Based UWB Imaging for Concealed Weapon Detection", EUSAR Conference 2010k Aaachen, Germany, pp. 194-197.

Xiaodong Zhuge et al., "Near-Field Ultra-Wideband Imaging with Two-Dimensional Sparse MIMO Array", Proceedings of the $4^{th}$ European Conference Antennas and Propagation (EuCAP) 2010, 4 Pages.

Graham M. Brooker, Understanding Millimetre Wave FMCW Radars, $1^{st}$ International Conference on Sensing Technology, Nov. 21-23, 2005, pp. 152-157.

* cited by examiner

BEAM FORMING DEVICE AND METHOD

CROSS REFERENCE TO RELATED APPLICATION

The present application claims the benefit of the earlier filing date of 11 167 065.9 filed in the European Patent Office on May 23, 2011, the entire content of which application is incorporated herein by reference.

BACKGROUND

1. Field of the Disclosure

The present disclosure relates to a beam forming device and a corresponding method. The present disclosure relates further to an active imaging device and an active imaging method for imaging a scene as well as to a beam forming unit and a processing method. Still further, the present disclosure relates to a computer program and to a computer readable non-transitory medium storing such a computer program. The present disclosure relates particularly to MIMO beam forming devices and methods.

2. Description of Related Art

Active imaging systems are becoming more and more popular at ultrasonic, microwave, millimeter and terahertz frequencies for a number of applications including medical and security applications.

The arrangement of transmitter (herein also called "transmit element") and receiver (herein also called "receive element") in an active imaging system may take on many different forms. In an embodiment relevant for the present disclosure multiple transmitters and receivers work together to form a MIMO radar (or MIMO active imaging system.) There are predominately two different types of MIMO radars. The first type is called statistical MIMO, in which the antennas (generally the "transmit elements" and the "receive elements") are placed far apart from each other to provide different views of the object (generally the "scene"). The second type of MIMO is called beam forming (or co-located) MIMO in which the antennas are placed close to each and act together to form a "virtual" beam forming array. The present disclosure primarily applies to the beam forming MIMO arrangement.

MIMO beam forming in one dimension is typically combined with other techniques (i.e. synthetic aperture radar) to form a 2D image. Alternatively, MIMO beam forming can be performed in two dimensions to form a 2D image. To yield a full 3D image of an object (or a 2D image with additional distance/depth information), such arrangements typically transmit a wideband continuous waveform (i.e. frequency modulated continuous wave (FMCW)) or a wideband pulse to provide ranging information.

For any of the above MIMO beam forming arrangements, when there is a large distance between the object and the receiver/transmitter arrangement (the so called "far field" case) the optimum weights for a given angular direction to perform MIMO beam forming do not change significantly when the distance to the object is varied. However, when the distance between the object and the receiver/transmitter arrangement is short (the so called "near field" case) the optimum weights to perform MIMO beam forming change significantly with changing distance.

Imaging systems using the MIMO beam forming technique and obtaining distance information are generally known.

J. H. G. Ender, J. Klare, "System Architectures and Algorithms for Radar Imaging by MIMO-SAR", IEEE Radar Conference 2009 describes a system in which a MIMO beam forming array is used in one dimension (in this case in the direction of the aircraft wings) and a Synthetic Aperture Radar (SAR) is created in the movement direction (in this case the aircraft's forward motion) to create a 2D image. The third dimension (distance from the aircraft to objects on the ground) is obtained by using the frequency modulated continuous wave (FMCW) technique. However, this system operates in scenarios where there is a large distance between the transceiver and the objects on the ground.

J. Klare, O Saalmann, H. Wilden, "First Experimental Results with the imaging MIMO Radar MIRA-CLE X", EUSAR Conference 2010 describes a system in which SAR is combined with MIMO beam forming to create a 2D image and FMCW is used to provide the third dimension, which is the distance information to the object. This system is used in a similar way to the system described by J. H. G. Ender et al., in which the distance between transceiver and receiver is very large.

X. Zhuge, A, Yaravoy, "MIMO-SAR Based UWB Imaging for concealed Weapon Detection", EUSAR conference 2010 Aachen, Germany, p. 195-197 describes a system in which SAR is combined with MIMO beam forming to create a 2D image. The third dimension (distance to the object) is obtained by using a pulse based ultra wideband signal (UWB).

X. Zhuge, A. Yarovoy, "Near-Field Ultra-wideband Imaging with Two dimensional Sparse MIMO Array", Proceedings of the fourth European Conference Antennas and Propagation (EuCAP) 2010, p. 1-4 describes a system in which the MIMO beam forming in used in two dimensions to create a 2D image. The third dimension (distance to object) is obtained by using a pulse based ultra wideband signal (UWB).

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

It is an object of the present disclosure to provide a beam forming device and a corresponding method that can be used for active imaging in the near field and provide a high accuracy even if the distance of the scene, e.g. of an object to be imaged, changes. It is a further object of the present disclosure to provide a corresponding active imaging device and a corresponding active imaging method, a beam forming unit and a processing method as well as a corresponding computer program for implementing said processing method in software and a computer readable non-transitory medium storing such a computer program.

According to an aspect of the present disclosure there is provided a beam forming device, comprising:

a transmit unit comprising at least two transmit elements that transmit radiation towards said scene, a radiation receiver unit comprising at least two receive elements that receive radiation from said scene and that generate receive signals from said received radiation, and a beam forming unit that performs beam forming to obtain beam formed output signals from said receive signals by use of beam forming weights, wherein said beam forming weights are adapted to a distance between the scene and one or more transmit elements and/or receive elements, said distance being indicated by a distance indicator, and wherein said beam forming weights are changed if said distance changes.

According to a further aspect of the present disclosure there is provided an active imaging device for imaging a scene comprising a beam forming device as proposed according to the present disclosure and a processing unit that processes said beam formed output signals, in particular for constructing an image from said beam formed output signals and/or detecting an object in said scene.

According to still a further aspect of the present disclosure a beam forming unit is provided comprising:

an input unit that receives receive signals generated from radiation received from a scene in response to radiation transmitted towards said scene and processing elements that perform beam forming to obtain beam formed output signals from said receive signals by use of beam forming weights, wherein said beam forming weights are adapted to a distance between the scene and one or more transmit elements and/or receive elements, said distance being indicated by a distance indicator, and wherein said beam forming weights are changed if said distance changes.

According to still further aspects corresponding methods, a computer program comprising program means for causing a computer to carry out the steps of the image construction method according to the present disclosure, when said computer program is carried out on a computer, as well as a computer readable non-transitory medium having instructions stored thereon which, when carried out on a computer, cause the computer to perform the steps of the beam forming method according to the present disclosure are provided.

Preferred embodiments are defined in the dependent claims. It shall be understood that the claimed beam forming device, the claimed methods, the claimed computer program and the claimed computer readable medium have similar and/or identical preferred embodiments as the claimed beam forming device and as defined in the dependent claims.

The present disclosure is based on the idea to optimise beam forming when the distance between the illumination unit/receiver unit (preferably forming a common transmitter/receiver arrangement) and the scene, in particular an object of the scene that shall be imaged, changes. This is especially important for short distance imaging applications when the object is in the "near field" with respect to the aperture of the receiver unit by which the receiving beam is formed.

For such short distance applications, the phase differences of received radiation from different transmit to receiver antennas changes as the scene (object) changes its distance with respect to the illumination unit and the receiver unit. Such an effect is not observed when the scene is far away ("far field case") since all the received signals have the same angle (all have parallel propagation paths).

To solve this object for beam forming (in particular for MIMO beam forming) for short distance near field imaging it is essentially proposed according to the present disclosure that different beam forming weights are used for different receiver/transmitter distances, said distance being indicated by a distance indicator. In other words, if the distance changes, as indicated by a change of the distance indicator, the beam forming weights (which are generally complex weights having an amplitude and a phase) are changed accordingly according to the changed distance to enable an optimum beam forming that is optimized for the changed distance. Thus, the present disclosure proposes to adaptively change the beam forming weights depending on the distance between the scene (object) and the transmitters and receive elements to maintain the optimal beam formed radiation pattern at short distances. This finally leads to an increased accuracy of the imaging even if the distance of the scene changes continuously or from time to time.

As proposed according to preferred embodiments the distance can be measured using the already available ranging information (provided that the active imaging device has this functionality) resulting in a total automatic solution. Alternatively, the distance maybe be measured using an additional ranging device (e.g. a distance determination unit using optical or ultrasonic techniques). A further alternative is that the required distance of interest can be selected by the operator, i.e. the operator can directly enter the present distance (which is then also used as distance indicator) if known in any way (e.g. from distance markings between the receiver unit and the scene. Also mixed embodiments including two or more ways for determining the distance are available according to the disclosure.

According to part of the cited prior art the above explained problem does not arise, in particular in devices using MIMO beam forming in the far field, so that there is no need to change the (predetermined and fixed) beam forming weights depending upon the distance from the scene (object) to the transmitters and receivers. According to another part of the cited prior art short distance imaging is described, but the distance from the scene (object) to the transmitters and receivers is predetermined and fixed.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Active imaging systems, including active imaging devices and methods, are becoming increasingly popular at ultrasonic, microwave, millimeter and terahertz frequencies for a number of applications including medical and security applications. Security active imaging systems for example enable suspicious items hidden under clothes or in bags to be visualised and to be easily identified. Medical active imaging systems on the other hand enable the visualisation of a huge variety of biological items.

The arrangement of transmitter and receiver in an active imaging system may take on many different forms but in the following systems in which multiple transmitters and receivers work together to form a MIMO radar or MIMO active imaging device will be mainly considered.

Figure 1:
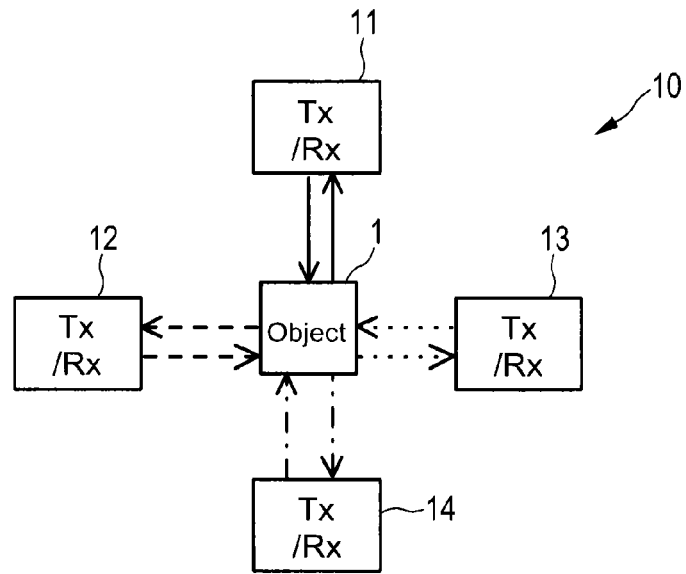
FIG. 1 shows a schematic diagram of a statistical MIMO device.

There are predominately two different types of MIMO radar. The first type is called statistical MIMO. In this system the antennas are placed far apart from each other and typically consist of multiple radars to provide different views of the object. By doing this the MIMO radar provides robustness signals against fading, since the total received signal is a superposition of all of the different received signals. An example of a statistical MIMO device 10 with four radar units 11, 12, 13, 14 providing four different views of an object 1 is shown in FIG. 1.

Figure 2:
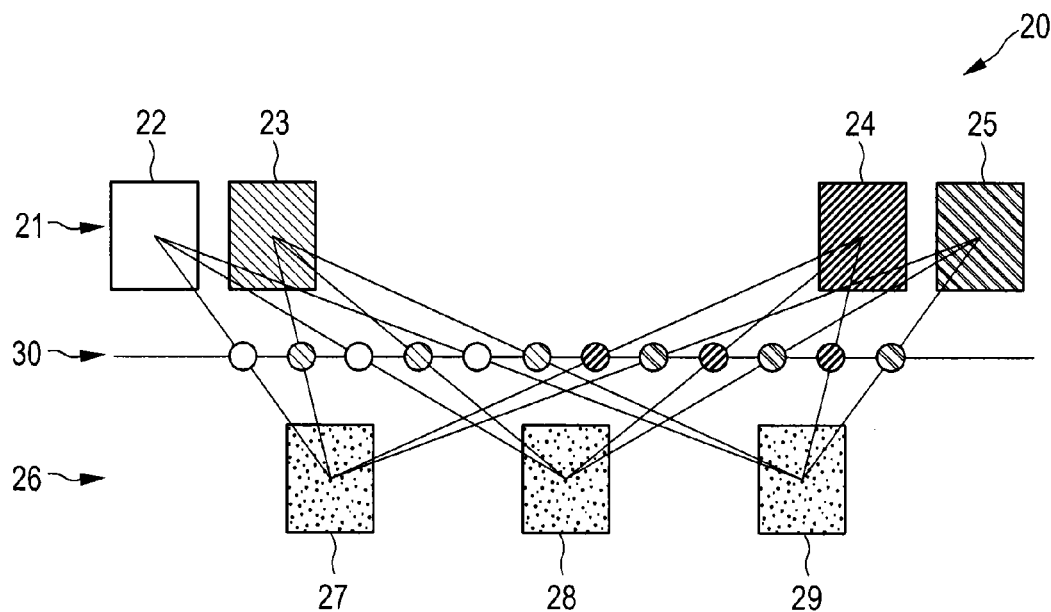
FIG. 2 shows a schematic diagram of a co-located MIMO device.

The second type of MIMO radar is called co-located MIMO (or beam forming MIMO). In this system the antennas are placed close to each other and act together to form a "virtual" beam forming array. A co-located MIMO device 20 comprising a transmitter array 21 including several (here four) transmitters 22, 23, 24, 25 and a receiver array 26 including several (here three) receivers 27, 28, 29 is schematically shown in FIG. 2. Since the antenna gain of any array is directly proportional to the number of antenna elements, the advantage of such an arrangement (when it is optimally designed) is that the number of elements in the virtual array 30 (indicated by the dots between the transmitter array 21 and the receiver array 26) is $N_{Tx} \times N_{Rx}$, where $N_{Tx}$ is the number of transmitters and $N_{Rx}$ is the number of receivers, but the number of transmitters and receivers is only $N_{Tx} + N_{Rx}$.

The present disclosure primarily applies to the co-located MIMO (or beam forming MIMO) case as schematically shown in FIG. 2, which shall be explained in more detail first. As already stated above, the transmitter antennas 22, 23, 24, 25 and the receiver antennas 27, 28, 29 act together to form a virtual array 30. Each position of this virtual array 30 corresponds to a certain combination of transmitter and receiver antennas. In the same way as a normal receiver array, each received signal is multiplied by a complex weight ($A e^{j\alpha}$) (also called "beam forming weight") which amplitude weights (via A) and phase shifts (via angle $\alpha$) each received signal. The outputs of these multipliers are then summed up to produce the final output.

By changing the phase shifts for each received signal, the angle of the received signal for which the array has the highest sensitivity is changed and therefore the resulting beam can be steered by changing the phase shifts. By changing the amplitude weights of the individual received signals, the ratio of each received signal to the overall receiver power is changed and the exact beam receiver sensitivity against angle can be changed.

Figure 3:
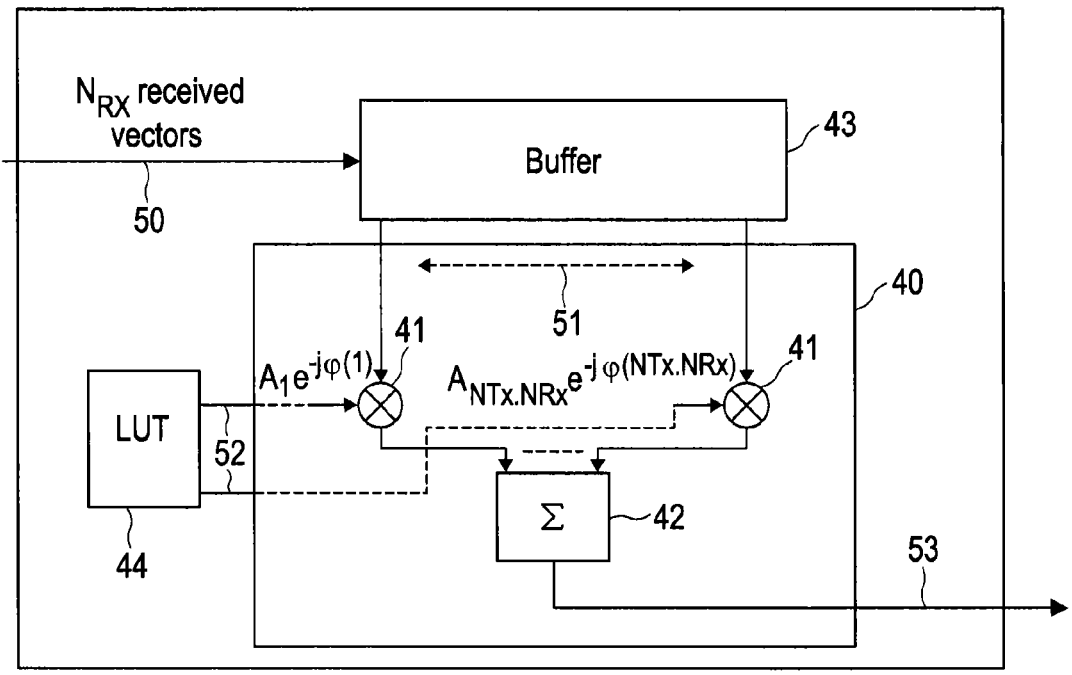
FIG. 3 shows an embodiment of a known beam forming unit.

The main difference between normal receiver beam forming and MIMO beam forming is that with MIMO beam forming each received signal from every transmitter/receiver combination (or virtual array position) needs to be multiplied by the correct complex (beam forming) weight to steer the beam to the correct angle. If the different transmit signals (from the different antennas) are transmitted one at a time (Tx signal time multiplexed), the final beam formed output can only be calculated when all of the transmit antennas have transmitted their respective signals. An embodiment of a corresponding beam forming unit 40 for performing beam forming to obtain beam formed output signals from the receive signals is schematically depicted in FIG. 3. It comprises $N_{Tx} \times N_{Rx}$ multipliers 41 for multiplying the $N_{Tx} \times N_{Rx}$ different receive signals 51 (e.g. stored in a buffer 43 receiving as input the $N_{Rx}$ received vectors 50) with an individual beam forming weight and a summation unit 42 for summing up the outputs of the multipliers 41. A look up table (LUT) 44 is provided which stores the correct $N_{Tx} \times N_{Rx}$ complex weights 52 to steer the beam in a specific direction. The beam formed output 53 is output from the summation unit 42.

Figure 4:
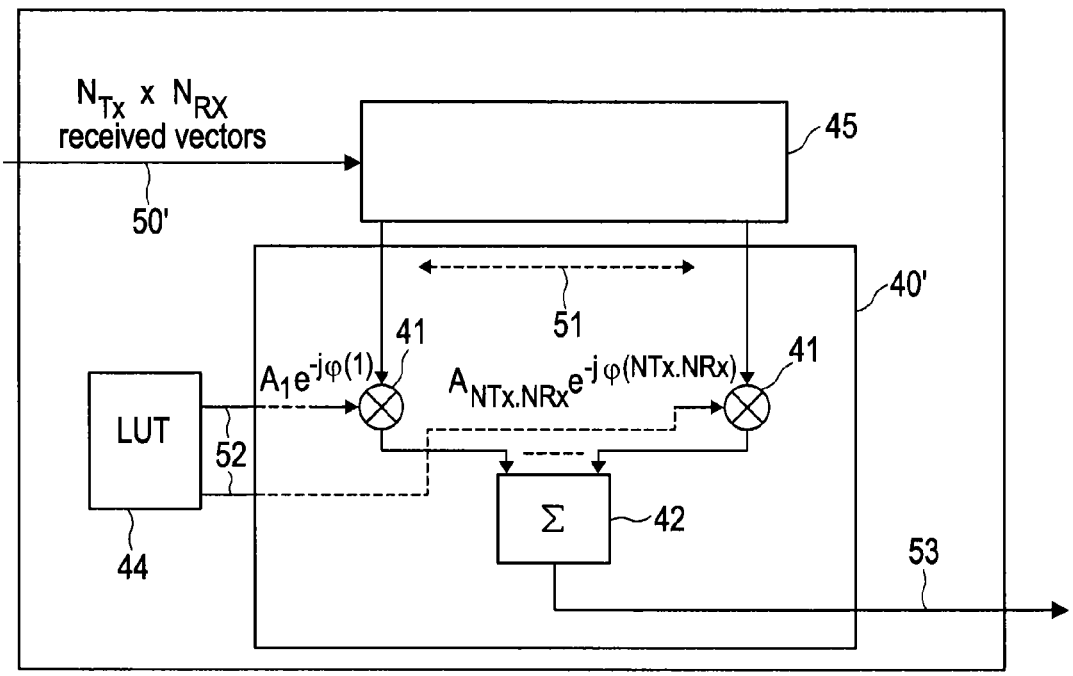
FIG. 4 shows another embodiment of a known beam forming unit.

If the MIMO beam forming system is designed so that all of the transmit antennas can transmit at the same time, then the final beam formed output can be calculated more quickly since only one transmit signal needs to be transmitted. An embodiment of an implementation of such a beam forming unit 40' is schematically depicted in FIG. 4. In this case the input unit 45 is receiving as input the $N_{Tx} \times N_{Rx}$ received vectors 50' at the same time and therefore no buffer (like the buffer 43 of the embodiment shown in FIG. 3) is needed.

Figure 5:
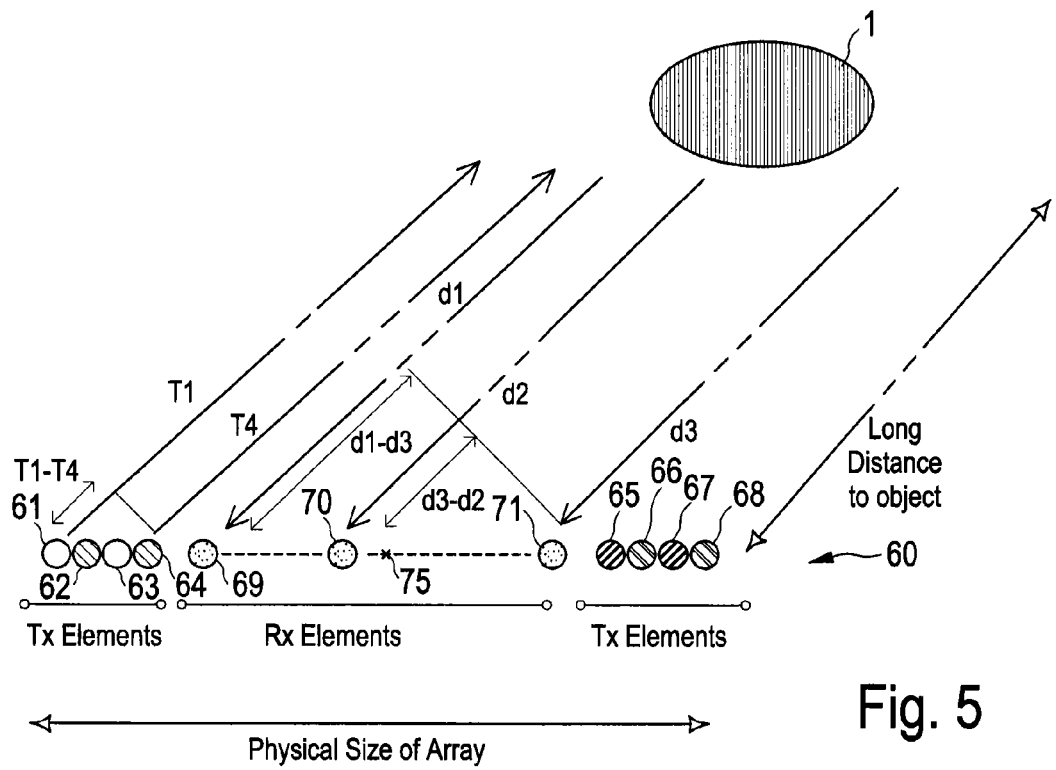
FIG. 5 shows a diagram illustrating signal paths for far field imaging.

An example of how the transmitted and received signals propagate from the transmitting antennas in a MIMO array to an example object (generally a scene) 1 which is a long distance away is shown in FIG. 5. For such a scenario, because of the large distance between the transceiver array 60 (comprising a number of transmit antennas 61-68 at the edges of the array 60 and a number of receive antennas 69, 70, 71 in the middle) and the target (object) 1, the different propagations paths between the different transmit antennas 61-68 and the example object 1 are essentially parallel. Two example paths T1 and T4 are shown. Due to this reason as the distance between the object 1 and the array 60 is changed, the difference in path length between the different transmitters 61-68 and the object 1 does not change. It should be noted here that the distance is regarded as the distance between the object and a reference point 75 on the array 60, the reference point 75 being e.g. located in the middle of the array 60 (but generally also be placed somewhere else since it is generally the change of the distance that is of primary interest according to the present disclosure).

An example for the transmit path difference T1-T4 is also shown in FIG. 5. The same is true for the received reflected signals from the object 1 to the antenna array 60. Example received signal paths in FIG. 5 are labelled as d1, d2 and d3. Example differences between these paths are shown as d1-d3 and d2-d3. As the distance from the object 1 to the antenna array 60 is changed (and so long as that the different propagation paths remain parallel), these receive path differences also do not change.

As explained above, the phase shifts between the different receive signals enable moving the angle of the required beam by changing the complex beam forming weights, in particular the phase shifts (here, a phase shift difference equates to a path length difference). Since in this long distance case shown in FIG. 5, the path differences do not change when the object to antenna array distance changes, any complex phase weights which are set in the MIMO array to steer to a specific angle are also valid when the distance is changed, since the respective path differences remain the same.

Figure 6:
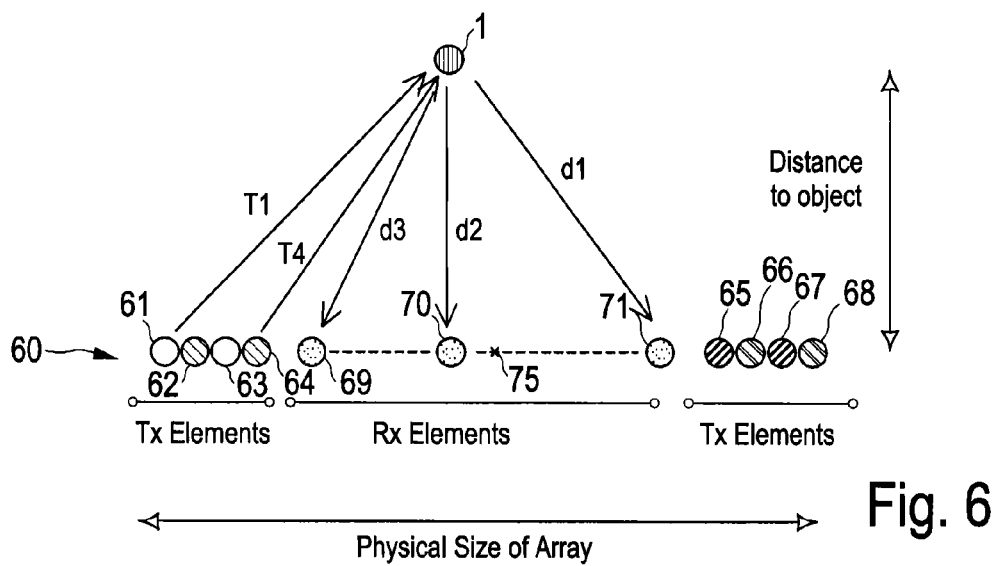
FIG. 6 shows a diagram illustrating signal paths for near field imaging.

When the object is close to the antenna array, however, the situation changes. Such a situation is depicted in FIG. 6. In such a situation the propagation paths from the different transmitting antennas 61-68 to the example object 1 all have different angles (they are no longer parallel). Example paths shown are T1 and T4. The same is true for the receive signal from the example object 1 to the receiver antennas 69, 70, 71. This means that, as the distances between the object 1 and the antenna array 60 is changed, the path differences between the different transmitted signals and the object 1 also change. The same is true for the receive signals as the distance is changed. This changing of path difference with changing object distance means that any complex weights which are set in the MIMO array to steer to a specific angle are no longer valid when the object to array distance is changed.

It shall be noted here that for this explanation the differences for the signal propagation paths have been shown in FIGS. 5 and 6 when the object 1 is close to the antenna array 60 and when the object 1 is a long way away from the antenna array 60. However, the size of the array 60 is also important. Therefore the ratio of "(distance to object)/(size of array)" is effectively another criterion. If this ratio is very high, the object can be regarded to be in the far field (i.e. the propagation paths are parallel) and if the ratio is low, the object can be regarded to be in the near field (i.e. the propagation paths are not parallel). In other words, whenever it is mentioned herein that the distance from the object to the antenna array (i.e. the transmit elements and the receive elements) is small (i.e. a near field case, in which the present disclosure is mainly applied), it shall be understood that this includes cases where the above mentioned ratio of "(distance to object)/(size of array)" is low.

Generally, objects which are placed at distances from the antenna array greater than $$\frac{2D^2}{\lambda} \quad (1)$$

where D is the aperture size of the antenna (or 'virtual size' of MIMO array) and $\lambda$ is the wavelength of the signal being transmitted (or received) are commonly referred to be in the far field. For objects which are placed at a lower distance $R_1$ from the antenna array, where $R_1$ is defined as $$0.62\sqrt{\frac{D^3}{\lambda}} < R_1 < \frac{2D^3}{\lambda} \quad (2)$$

are commonly referred to be in the "radiating near field". For objects which are placed at an even closer distance $R_2$, where $R_2$ is defined as $$R_2 < \frac{2D^2}{\lambda} \quad (3)$$

are commonly referred to be in the "reactive near field".

Generally, as an example, if it is assumed that the frequency of operation is 35 GHz ($\lambda$=8.57 mm) and that the antenna has an aperture size of 25$\lambda$ (D=21.4 cm), the far field starts at antenna to object distances greater than 10.7 meters. Objects placed between 10.7 meters and 0.663 meters from the antenna are said to be in the "radiating near field". Objects placed closer than 0.663 meters are said to be in the "reactive near field". Thus, in this example the disclosure is at least applied for all applications where the object may be located at a distance of less than 10.7 meters from the antenna array.

Figure 7:
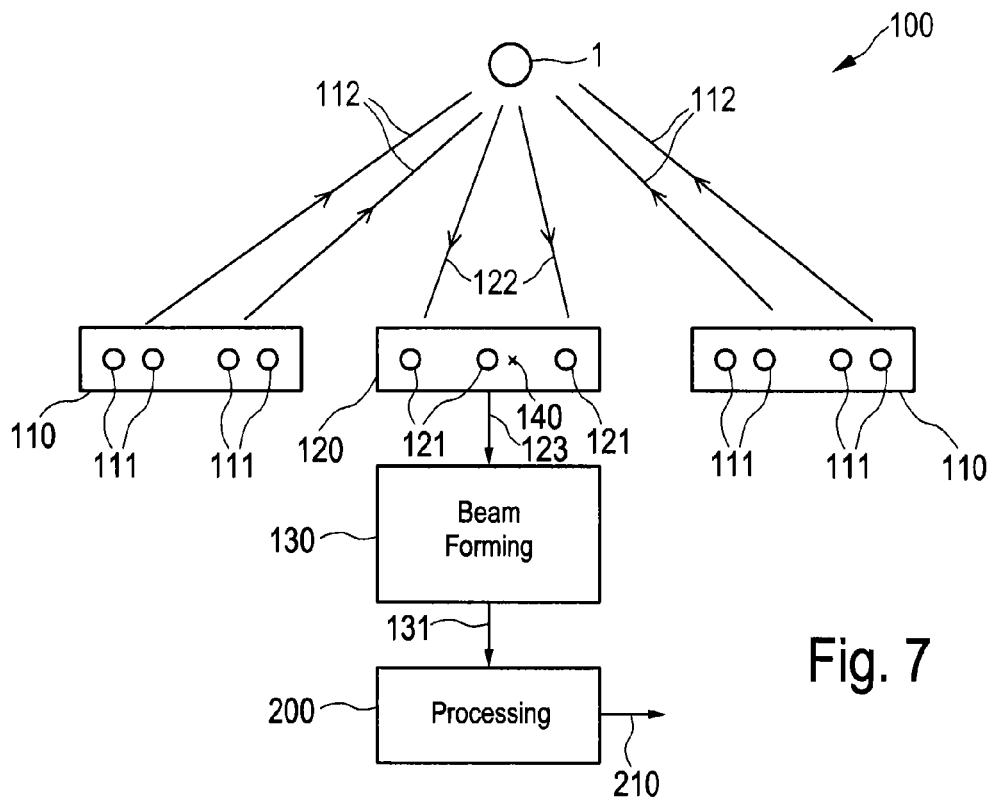
FIG. 7 shows a first embodiment of an active imaging device according to the present disclosure.

FIG. 7 shows a schematic diagram of an active imaging device 100 according to the present disclosure for imaging an object 1 or, more generally, a scene including said object. It comprises a transmit unit 110 (here split into two transmit subunits) comprising at least two (here: eight) transmit elements 111 that transmit radiation 112 towards said object 1 (said radiation 112 being also referred to as transmit signals 112 hereinafter). A radiation receiver unit 120 is provided comprising at least two (here: three) receive elements 121 that receive radiation 122 from said object 1 and that generate receive signals 123 from said received radiation 122. In various embodiments, the transmit unit 110 and the receiver unit 120 together form an antenna array, in which the various antennas, i.e. the transmit elements 111 and the receive elements 121 are arranged along a line (as shown in FIG. 7, where the transmit elements 111 are arranged at the left and right edges and the receive elements 121 are arranged in the middle) or on a common plane forming a two-dimensional array. However, other arrangements of the transmit elements 111 and the receive elements 121 are also possible.

For forming a beam of said object 1 or the whole scene from the receive signals 123 the active imaging device 100 further comprises a beam forming unit 130, e.g. implemented by a processor, computer, software or dedicated hardware, which performs beam forming to obtain beam formed output signals 131 from said receive signals 123 by use of beam forming weights. In some embodiments, e.g. in embodiments employing an FMCW approach (as explained below) the transmit signals 112 are used in addition to the receive signals 123 (e.g. in a mixer on the receiver side of an FMCW radar) to obtain the beam formed output signals 131.

The beam formed output signals 131 may be further processed in a processing unit 200 to obtain an output signal 210, e.g. an image construction unit to construct an image 210 of the scene, which processing unit 200 may be implemented by a processor, computer or dedicated hardware. But the beam formed output signals 131 may also be used for other purposes in other applications, e.g. for analysing the structure and/or material of the object, for detecting or tracking an object or for determining an object's distance and/or velocity, for which other applications the processing may also be performed in the processing unit 200.

The active imaging device 100 according to the present disclosure is generally configured for MIMO beam forming. The transmit elements 111 are either sequentially transmitting radiation (transmit signals) towards said scene or are simultaneously transmitting towards said scene, wherein the radiation transmitted by different transmit elements 111 is coded differently, modulated differently or are transmitted on different frequencies.

According to the present disclosure the beam forming weights are adapted to a distance between the object 1 and one or more transmit elements 111 and/or receive elements 121, said distance being indicated by a distance indicator. If said distance changes, as will be indicated by the distance indicator, said beam forming weights are changed accordingly to ensure optimum beam forming in the beam forming unit to obtain, irrespective of the distance between object and the transmit unit 110 and the receiver unit 120, reliable beam formed output signals and, thus, enable a most accurate signal processing in the processing unit 200, e.g. to obtain most accurate images of the scene.

Said distance indicator may be a distance between said object 1 (or scene) and a reference point 140. Said reference point 140 often is located in the middle of the antenna array, as shown in FIG. 7, but may also be arranged somewhere else (e.g. at a border of the antenna array) where the distance to the object 1 (or scene) clearly and most accurately indicates any changes of said distance.

In another embodiment said distance indicator is a distance between said object (or scene) and an average distance, said average distance being an average value or of two or more distances between said object 1 (or scene) and different transmit elements 111 and/or receive elements 121. In other words, if the distances between said object 1 (or scene) and two or different transmit elements 111 and/or receive elements 121 are known (as will be explained below) average can be formed for use as said distance indicator.

Figure 8:
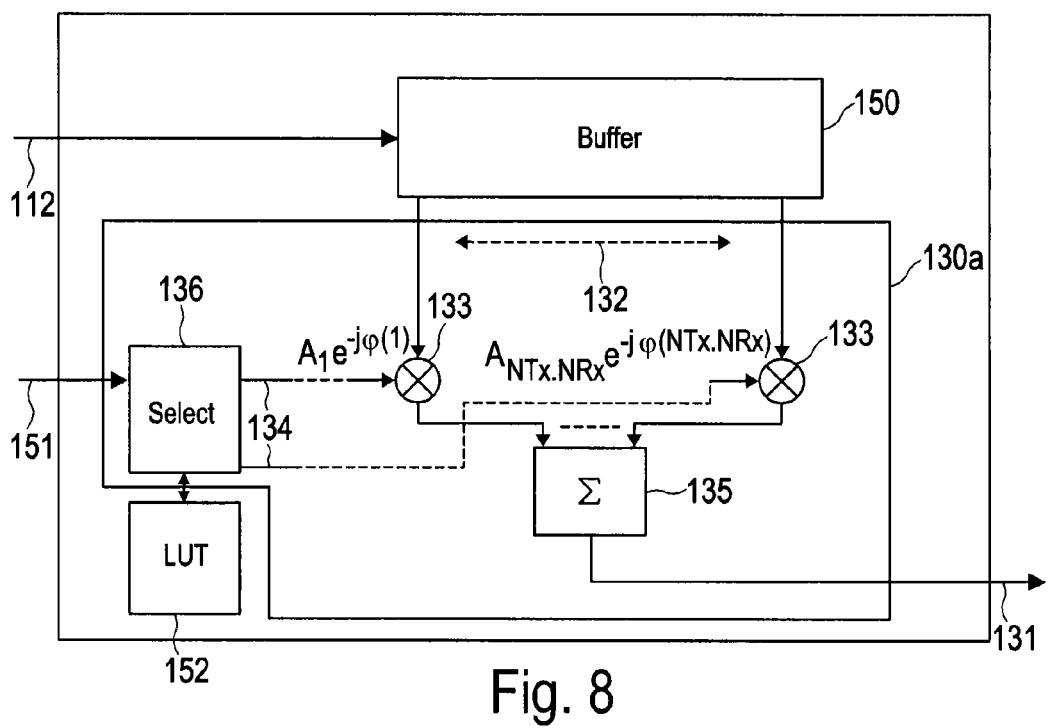
FIG. 8 shows a first embodiment of a beam forming unit according to the present disclosure.

An embodiment of a beam forming unit 130a according to the present disclosure is schematically depicted in FIG. 8. Generally, this beam forming unit 130 has some similarities with the beam forming unit 40, 40' shown in FIGS. 3 and 4, but includes further elements and functionalities. The receive signals 123 are also generally stored in a buffer 150 provided for storing all receive signals from the different transmitter and receiver combinations. The receive signals are to be multiplied by the respective beam forming weights 134 in the multipliers 133 as explained above. A summation unit 135 is provided for summing the outputs of the multipliers 133 to obtain the beam formed output signals 131.

Contrary to the known embodiments, however, the beam forming weights 134 are not fixed and predetermined, but they change if the distance between object 1 (scene) and antenna array 110, 120 changes, as indicated by a distance indicator 151 that is also provided to the beam forming unit 130a. Based on this distance indicator 151a selection unit 136 selects the correct beam forming weights 134 from a storage unit 152 that stores a plurality of sets of beam forming weights for different distances. As the arrangement of the transmit unit 110 and the receiver unit 120 is generally fixed these sets of beam forming weights are preferably acquired in advance by suitable simulations or calculations. These simulated/calculated weights may be adjusted after a calibration procedure has taken place which measures the specific characteristics of the individual receiver and transmitters. The final optimum beam forming weights are then stored in the storage unit 152.

As in practise the number of sets of stored beam forming weights is limited (i.e. not for exactly each distance a set will be available), the set of beam forming weights assigned to the present distance or a distance closest to the present distance will be taken from said storage unit 152 by the selection unit 136 for performing the beam forming. In another embodiment the sets of beam forming weights assigned to distances closest to the present distance will be taken from said storage unit 152 by the selection unit 136 and a set of interpolated beam forming weights will be calculated, preferably by the selection unit or a separate calculation unit, from the sets taken from said storage unit 152 for performing the beam forming.

Figure 9:
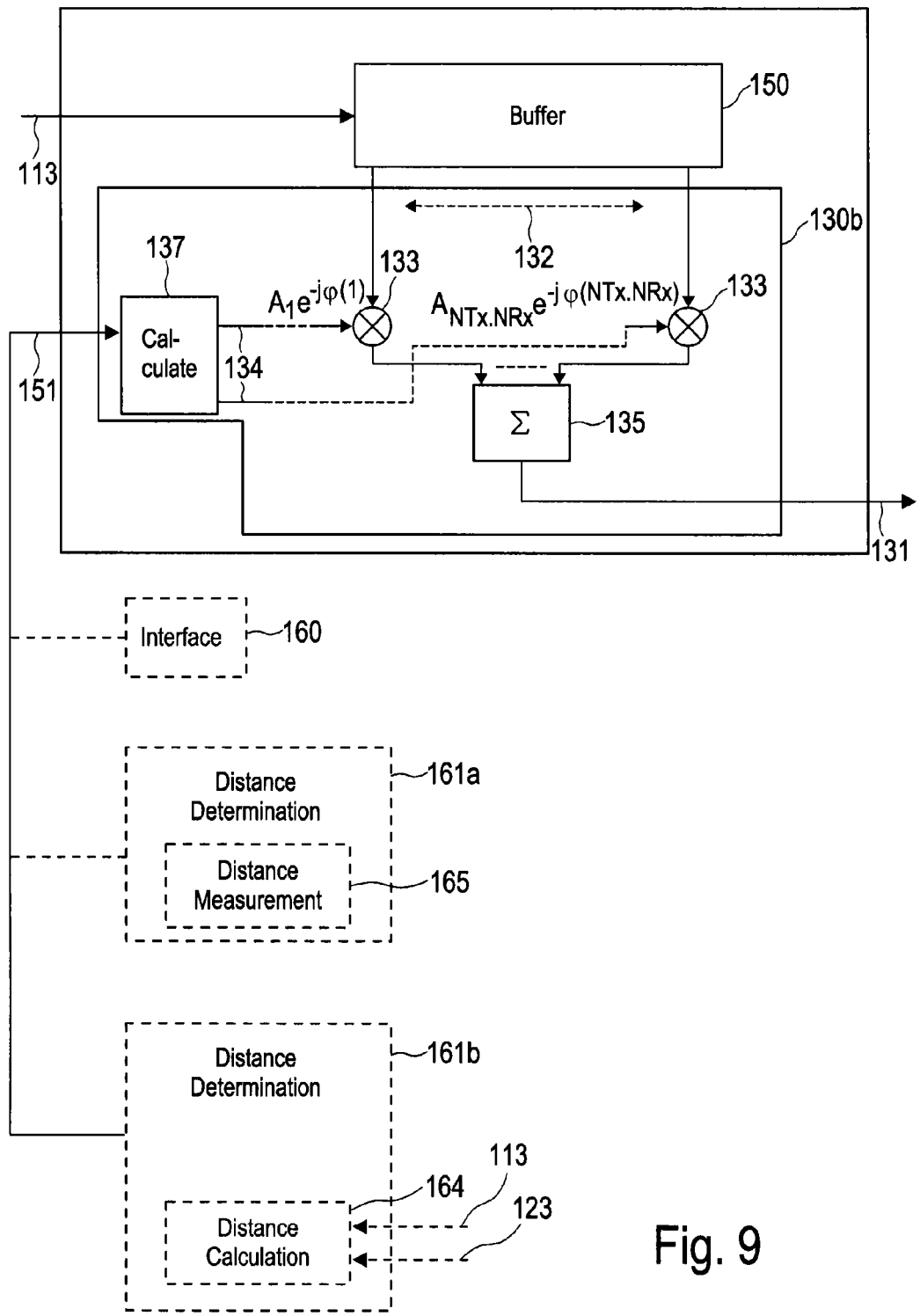
FIG. 9 shows a second embodiment of a beam forming unit according to the present disclosure.

In an alternative embodiment of a beam forming unit 130b as depicted in FIG. 9 a weights calculation unit 137 is provided that determines the beam forming weights according to the present distance as indicated by the distance indicator 151. Thus, the weights are not acquired in advance and stored in a storage unit, but are calculated on the fly.

Preferably, for this calculation the weights calculation unit 137 receives as input information about the antenna array geometry (in particular the positions of the transmit elements 111 and the receive elements 121), the required beam angle, the distance to the object and the frequency of operation. Once the variables have been received by the weights calculation unit 137, the phase differences between the different propagation paths for the different channels (different transmitter (Tx) and receiver (Rx) elements) can be calculated for the required beam angle, distance to object and frequency of operation. Assuming that there are $N_{Tx}$ transmit elements 111 and $N_{Rx}$ receive elements 121a ($N_{Tx} \times N_{Rx}$) matrix T can be formed which contains exponentials $e^{-j\theta_{ij}}$ representing these phase difference between each Tx/Rx combination (i=1, ..., $N_{Tx}$ and j=1, ..., $N_{Rx}$). A simple algorithm for maximum signal strength in the required beam direction would then set the final complex beam forming weights to T* where (*) represent the conjugate operation.

It should be noted that this is just an example of a beam forming algorithm for maximum signal power in the required beam direction. More sophisticated algorithms may be used which take into account the presence of interfering signals (and optimize the carrier to interference ratio) or may require additional parameters (i.e. angles where a minimum response is required).

Figure 10:
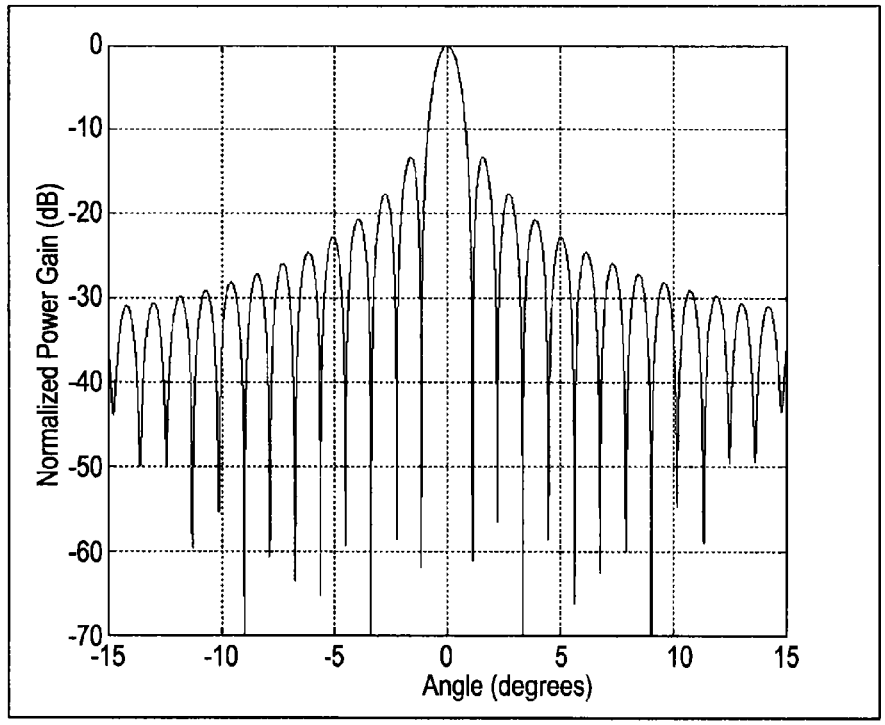
FIG. 10 shows a diagram illustrating an antenna array response obtained with fixed complex weights optimised for a fixed distance at said distance.

FIG. 10 shows the simulation response (power gain against angle) of an exemplary MIMO beam forming line arrangement (similar to that show in FIG. 2) in which eight transmitters are used (with a spacing 0.5 wavelengths) and eight receivers are used. The distance between the antenna array and the object is set to 117 wavelengths. In this case, the beam forming weights have been calculated to be used at this distance and to point at the zero degree position.

Figure 11:
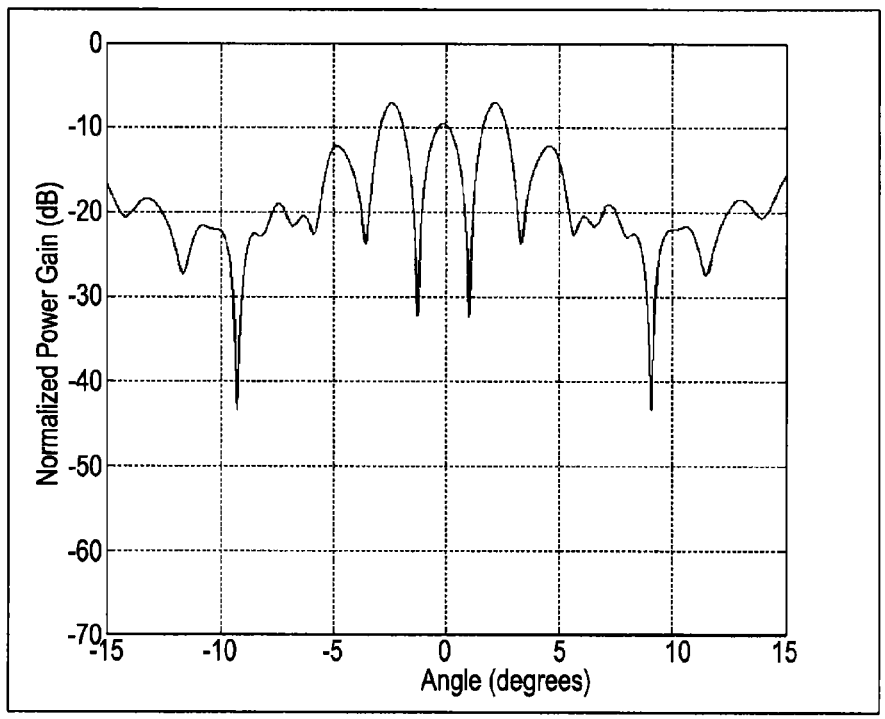
FIG. 11 shows a diagram illustrating an antenna array response obtained with fixed complex weights optimised for a fixed distance at a different distance.

When the same beam forming arrangement (and the same complex weights) is used at 58 wavelengths distance, the simulated response as shown in FIG. 11 is obtained. As can be seen there is considerable degradation in the antenna array response when compared to FIG. 10.

Figure 12:
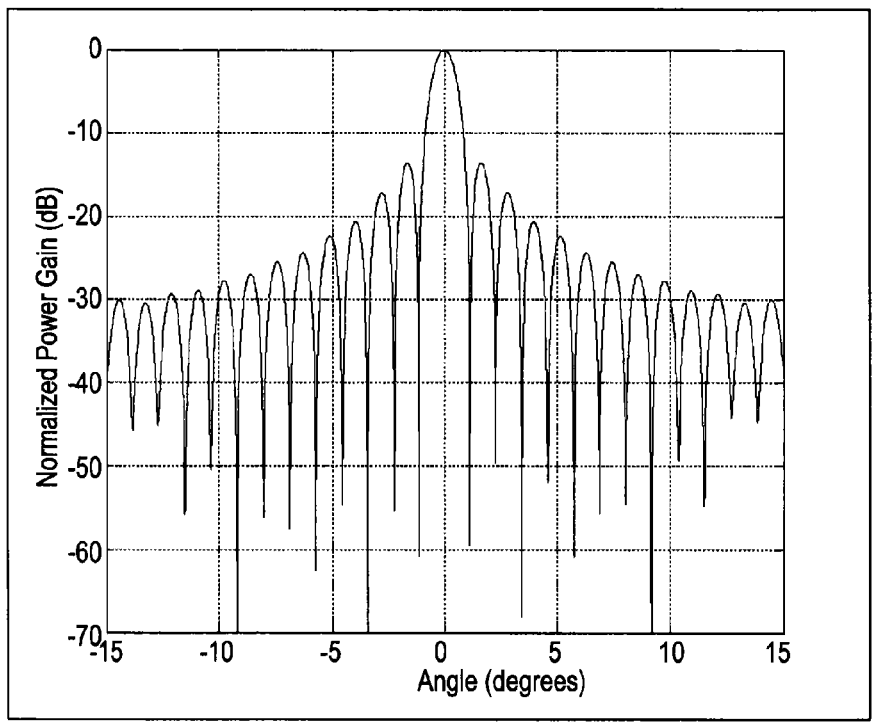
FIG. 12 shows a diagram illustrating an antenna array response obtained with fixed complex weights adapted to the changed distance.

If however the complex weights are modified and optimised, as proposed according to the present disclosure, to be used at the new distance of 58 wavelengths, the antenna array response can be much improved. FIG. 12 shows the response when the same antenna array is used with new complex weights optimised for 58 wavelengths. As can be seen the resulting response is virtually the same as that at 117 wavelengths (as shown in FIG. 10.

The distance indicator used according to the present disclosure for selecting or calculating the optimum beam forming weights can be obtained in different ways according to various embodiments of the present disclosure. In FIG. 9 different options (which can also be used at the same time or in other embodiments of the beam forming unit) are shown. The various elements for obtaining the distance are shown as elements of the active imaging device external from the beam forming unit, by may (partly or completely) also be part of the beam forming unit.

In one embodiment the distance value 151 (representing the distance indicator) is selectable by the user or operator via an interface 160, as shown as one option in FIG. 9. Said interface may be implemented by selection wheel, touch screen, screen menu, mouse, keyboard or any other suitable man machine interface. This is particularly useful if the distance is known or can be easily acquired, e.g. by use of any markings (e.g. on the floor or wall), by the user or operator.

In another embodiment the distance value 151 (representing the distance indicator) is measured using an external distance determination unit 161a for determining the present distance. This distance determination unit 161*a* preferably comprises a distance measurement unit 165, in particular an optical measurement unit, an ultrasound measurement unit or an electronic measurement unit, i.e. uses laser techniques, ultrasonic technique or some other distance measurement technique.

In still another embodiment of the distance determination unit 161*b* a distance calculation unit 164 is provided that calculates the distance from said transmitted transmit signals 112 and the receive signals 123 obtained from radiation received in response to said transmit signals, e.g. from a single receive signal or from the averaged or weighted average of at least two receive signals. At least part of the information contained in the transmit signals and the receive signals (e.g. the time duration of the signals from a transmit element to a receive element) is generally used for determining the distance.

Hence, in an exemplary embodiment of the distance determination unit 161*b* the distance value is derived from the ranging information obtained from the active imaging system using MIMO beam forming. This option assumes (as would often be the case) that the active imaging system using MIMO beam forming transmits a waveform which is used to obtain ranging/distance information. Such waveforms typically include wideband short pulses (as often used in ultra wideband (UWB) radars), frequency modulation continuous wave (FMCW=Frequency Modulated Continuous Wave) pulses (chirp pulses) or some other suitable waveform which may or may not include any spreading or coding technique.

Since many active imaging systems could use such a ranging capability described above and because such systems typically use the FMCW technique, the FMCW technique shall be briefly described. A through explanation of FMCW can be found in G. Brooker, "Understanding Millimeter Wave FMCW Radars", 1st International Conference on Sensing Technology, Nov. 21-23, 2005, Palmerston North, New Zealand, p. 152-157.

Figure 13A:
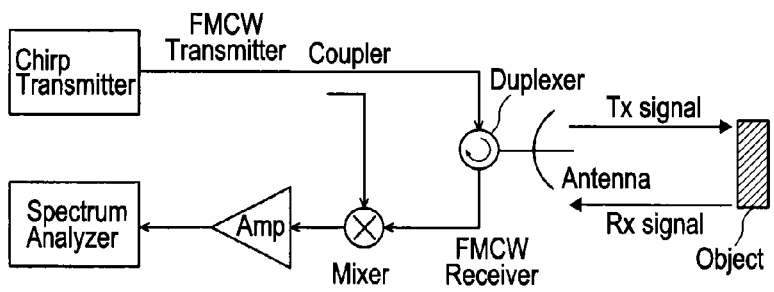
FIG. 13 shows a typical (frequency modulated continuous wave) FMCW radar system.

A FMCW radar, as generally shown in FIG. 13A, transmits a continuous wave signal that is frequency modulated (frequency is changing with time) to produce a chirp signal. This is transmitted to the object to be examined and is also fed to the receiver via a coupler. The transmitted signal will be reflected by the object, wherein the level of the reflection will depend upon the properties of the object, and be received by the receiver section of the FMCW radar. Since the transmitted chirp pulse (having a chirp pulse duration $T_b$) is changing its frequency with time, the exact frequency received for a given time instant depends upon how far away the object is located and upon the corresponding flight time (indicated as Tp in FIG. 13B). This received signal is then mixed with the transmitted chirp (via the coupler) and the output of the mixer has a frequency which is the difference in frequency between the transmitted and received signal. This is known as the beat frequency ($f_b$) and is directly proportional to the distance between the FMCW radar and the object.

Figure 13B:
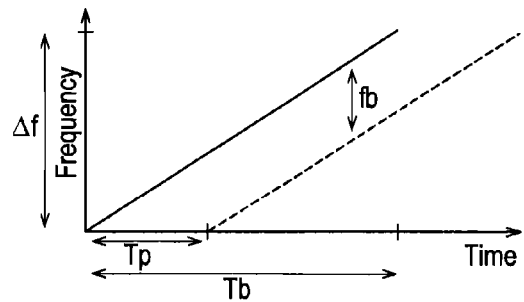
Figure 14:
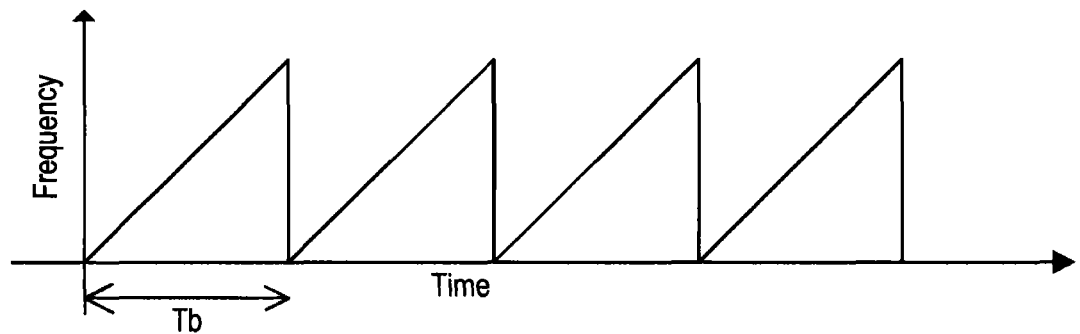
FIG. 14 shows typical frequency against time waveforms for a FMCW radar system.

The frequency variation against time of the transmitter signal (chirp pulse) and the received signal are shown in FIG. 13B as solid and dotted lines respectively. The difference in frequency between the transmitted signal and the received signal, the beat frequency ($f_b$) is also labelled. A typical FMCW radar system would typically send chirp pulses continuously and a typical variation of frequency with time is shown in FIG. 14. Other variations of the ramp signals are also possible. When the above described option of determining the distance, i.e. the use of ranging information obtained from the active imaging system using MIMO beam forming, is chosen for obtaining the ranging information, there are also several further options how the ranging information can be selected and processed.

Figure 15:
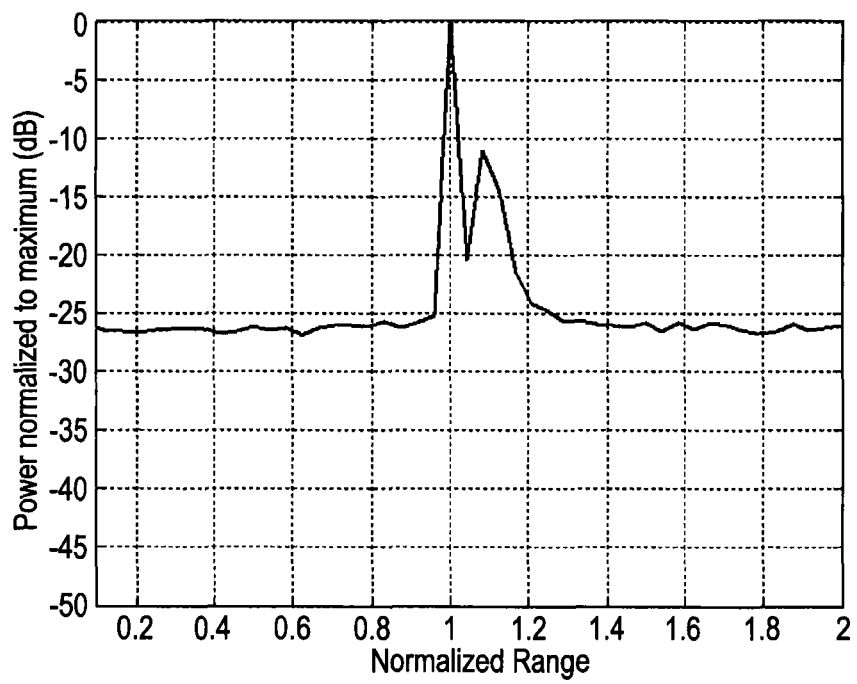
FIG. 15 shows typical range information obtained from two targets located at 1 meter and 1.1 meters.

The selection of the ranging information to be processed can be based on one particular beam of interest or could be derived from the average or weighted average of several chosen beams representing a chosen area of interest. Once it has been decided which beam or which set of chosen beams are to be used for the ranging information, the most relevant distance needs to determined from the selected ranging information. An example output of ranging information for two example layers is shown in FIG. 15.

To determine the most relevant distance, it is proposed in an embodiment that the maximum peak of the ranging information is chosen. The maximum peak may represent the highest received power or the highest voltage of the ranging information. More sophisticated techniques may also be used, including the mean or weighted mean of multiple peaks. Such schemes would be useful when the object has multiple layers (as shown in FIG. 15). The selected distance would therefore be the mean (or weighted mean) of the distances of the different layers.

To obtain the ranging information, an initial signal is sent and received which means that the first received image frame may not be correctly optimized for distance. This approach is therefore preferably applicable for systems which have high frame rate, since at least one frame is needed for obtaining ranging information.

The ranging information maybe obtained in more than one iterative step and could continuously be updated, which would be especially useful if the object of interest (or chosen area of interest) is moving.

In summary, the present disclosure provides an active imaging device and method providing optimum beam forming performance and, hence, imaging spatial resolution at all object to antenna array distances and also for moving objects, i.e. if the distance changes (continuously or from time to time). Further, when objects are to be scanned in the near field of the antenna array, they can be placed at a range of distances, instead of fixed distances as is normally required according to known systems.

The disclosure has been illustrated and described in detail in the drawings and foregoing description, but such illustration and description are to be considered illustrative or exemplary and not restrictive. The disclosure is not limited to the disclosed embodiments. Other variations to the disclosed embodiments can be understood and effected by those skilled in the art in practicing the claimed disclosure, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

The invention claimed is:

1. A beam forming device comprising:
 a transmitter comprising at least two transmit elements that transmit radiation towards a scene;

a receiver comprising at least two receive elements that receive radiation from said scene and that generate receive signals from said received radiation; and beam forming circuitry configured to:
perform beam forming to obtain beam formed output signals from said receive signals by use of beam forming weights; and
adapt said beam forming weights based on a distance between said scene and one or more of said transmit elements and said receive elements, by changing said beam forming weights based on a distance indicator that indicates said distance between said scene and one or more of said transmit elements and said receive elements when said distance indicator indicates said distance has been changed such that a difference of said distance among said transmit elements and said receive elements is compensated for, said difference changing according to said distance.

2. The beam forming device as claimed in claim 1, wherein said beam forming device is configured for MIMO beam forming.

3. The beam forming device as claimed in claim 1, wherein said beam forming circuitry is configured to perform beam forming by multiplying all receive signals generated by the different receive elements by a separate beam forming weight.

4. The beam forming device as claimed in claim 1, wherein said transmit elements are configured to sequentially transmit radiation towards said scene.

5. The beam forming device as claimed in claim 1, wherein said transmit elements are configured to simultaneously transmit radiation towards said scene, wherein the radiation transmitted by different transmit elements are coded or modulated differently or are on different frequencies.

6. The beam forming device as claimed in claim 1, further comprising a storage that stores a plurality of sets of beam forming weights for different distances.

7. The beam forming device as claimed in claim 6, wherein said beam forming circuitry is configured to take a first set of beam forming weights assigned to a present distance or take a second set of beam forming weights assigned to a distance closest to the present distance when there is no set of beam forming weights assigned to the present distance from said storage for performing the beam forming.

8. The beam forming device as claimed in claim 6, wherein said beam forming circuitry is configured to take a plurality of sets of beam forming weights assigned to a plurality of distances within a determined distance from the present distance from said storage and to calculate a set of interpolated beam forming weights from the plurality of sets taken from said storage for performing the beam forming.

9. The beam forming device as claimed in claim 1, wherein said beam forming circuitry is configured to determine the beam forming weights according to a present distance between said scene and one or more of said transmit elements and said receive elements.

10. The beam forming device as claimed in claim 9, further comprising a distance determination unit that determines the present distance.

11. The beam forming device as claimed in claim 10, wherein said distance determination unit comprises either optical measurement circuitry, ultrasound measurement circuitry or electronic measurement circuitry.

12. The beam forming device as claimed in claim 10, wherein said distance determination unit calculates the distance from said transmitted transmit signals and the receive signals obtained from radiation received in response to said transmit signals.

13. The beam forming device as claimed in claim 12, wherein said transmit elements are configured to transmit wideband short pulses, chirp pulses, or FMCW pulses.

14. The beam forming device as claimed in claim 12, wherein said distance determination unit is configured to calculate the distance from a single-beam formed receive signal or from an averaged or weighted average of at least two-beam formed receive signals.

15. The beam forming device as claimed in claim 14, wherein said distance determination unit is configured to calculate the distance from a maximum peak representing a highest detected power or voltage.

16. The beam forming device as claimed in claim 14, wherein said distance determination unit is configured to calculate the distance from a mean or weighted mean of at least two maximum peaks representing the highest detected power or voltage.

17. The beam forming device as claimed in claim 1, further comprising an interface to enter the distance or modify the distance.

18. The beam forming device as claimed in claim 1, wherein said transmit elements and said receive elements are arranged to form a one-dimensional row or a two-dimensional array.

19. The beam forming device as claimed in claim 18, wherein said distance indicator is a distance between said scene and a reference point on said one-dimensional row or said two-dimensional array.

20. The beam forming device as claimed in claim 18, wherein said distance indicator is an average distance of two or more distances between said scene and different transmit elements and receive elements arranged on said one-dimensional row or said two-dimensional array.

21. A beam forming method comprising:
transmitting, using at least two transmit elements, radiation towards a scene;
receiving, using at least two receive elements, radiation from said scene;
generating receive signals from said received radiation;
performing, using circuitry, beam forming to obtain beam formed output signals from said receive signals by use of beam forming weights; and
adapting, using said circuitry, said beam forming weights based on a distance between said scene and one or more of said transmit elements and said receive elements, by changing said beam forming weights based on a distance indicator that indicates said distance between said scene and one or more of said transmit elements and said receive elements when said distance indicator indicates said distance has been changed such that a difference of said distance among said transmit elements and said receive elements is compensated for, said difference changing according to said distance.

22. An active imaging device for imaging a scene, comprising:
a beam forming device as claimed in claim 1; and
a processor that is configured to process said beam formed output signals to construct an image from said beam formed output signals and to detect an object in said scene.

23. An active imaging method for imaging a scene, comprising:

performing a beam forming method as claimed in claim 21; and processing said beam formed output signals for constructing an image from said beam formed output signals and for detecting an object in said scene.

24. A beam forming device comprising:

beam forming circuitry configured to:
- receive signals generated from radiation received from a scene by at least two receive elements in response to radiation transmitted towards said scene from at least two transmit elements;
- perform beam forming to obtain beam formed output signals from said receive signals by use of beam forming weights; and
- adapt said beam forming weights based on a distance between said scene and one or more of said transmit elements and said receive elements, by changing said beam forming weights based on a distance indicator that indicates said distance between said scene and one or more of said transmit elements and said receive elements when said distance indicator indicates said distance has been changed such that a difference of said distance among said transmit elements and said receive elements is compensated for, said difference changing according to said distance.

25. A processing method comprising:

receiving receive signals generated from radiation received from a scene by at least two receive elements in response to radiation transmitted towards said scene from at least two transmit elements;

performing, using circuitry, beam forming to obtain beam formed output signals from said receive signals by use of beam forming weights; and adapting, using said circuitry, said beam forming weights based on a distance between said scene and one or more of said transmit elements and said receive elements, by changing said beam forming weights based on a distance indicator that indicates said distance between said scene and one or more of said transmit elements and said receive elements when said distance indicator indicates said distance has been changed such that a difference of said distance among said transmit elements and said receive elements is compensated for, said difference changing according to said distance.

26. A computer readable non-transitory medium having instructions stored thereon which, when carried out on a computer, cause the computer to perform the processing method as claimed in claim 25.

\* \* \* \* \*